United States Patent [19]
Aoki et al.

[11] Patent Number: 6,072,153
[45] Date of Patent: Jun. 6, 2000

[54] AIR CONDITIONING APPARATUS HAVING ELECTRIC HEATING MEMBER INTEGRATED WITH HEAT EXCHANGER

[75] Inventors: Shinji Aoki, Kariya; Yoshimitsu Inoue, Chiryu; Koji Takahashi, Kariya, all of Japan

[73] Assignee: DENSO Corporation, Kariya, Japan

[21] Appl. No.: 09/216,362

[22] Filed: Dec. 18, 1998

[30] Foreign Application Priority Data

Dec. 25, 1997 [JP] Japan ................................. 9-358231
Oct. 7, 1998 [JP] Japan ................................. 10-285485

[51] Int. Cl.$^7$ ........................................... B60L 1/02
[52] U.S. Cl. .......................... 219/202; 165/202; 165/42; 165/43
[58] Field of Search .......................... 219/202; 165/202, 165/243, 43; 237/12.3 A, 12.3 B, 12.3 R; 454/161; 123/142.5 R; 62/325

[56] References Cited

U.S. PATENT DOCUMENTS

| 5,735,338 | 4/1998 | Chevroulet et al. | 165/42 |
| 5,775,415 | 7/1998 | Yoshimi et al. | 165/202 |
| 5,816,066 | 10/1998 | Aoki et al. | 62/355 |
| 5,816,495 | 10/1998 | Ito | 237/12.3 R |
| 5,899,183 | 5/1999 | Aoki et al. | 123/142.5 R |
| 5,954,120 | 9/1999 | Aoki et al. | 155/43 |
| B1 5,105,730 | 2/1995 | Smith | 454/161 |

FOREIGN PATENT DOCUMENTS

| 0203411 | 8/1988 | Japan . |
| 9-20129 | 1/1997 | Japan . |

*Primary Examiner*—Teresa Walberg
*Assistant Examiner*—Leonid Fastovsky
*Attorney, Agent, or Firm*—Harness, Dickey & Pierce, PLC

[57] ABSTRACT

An air conditioning apparatus for a vehicle includes a heat exchanger for heating air to be blown into a passenger compartment of the vehicle using hot water as a heating source, a plurality of electric heating members formed integrally with the heat exchanger, and a control unit for controlling electric power supplying to the electric heating members and an amount of air blown from a blower. The control unit controls the amount of air blown from the blower based on a heat-radiating amount from the electric heating members and a target temperature of air blown into the passenger compartment. Thus, even when number of the electric heating members to be turned on is changed, the temperature of air blown into the passenger compartment can be set to the target temperature by controlling the amount of air blown from the blower. As a result, the passenger compartment can be effectively quickly heated using the electric heating members.

27 Claims, 7 Drawing Sheets

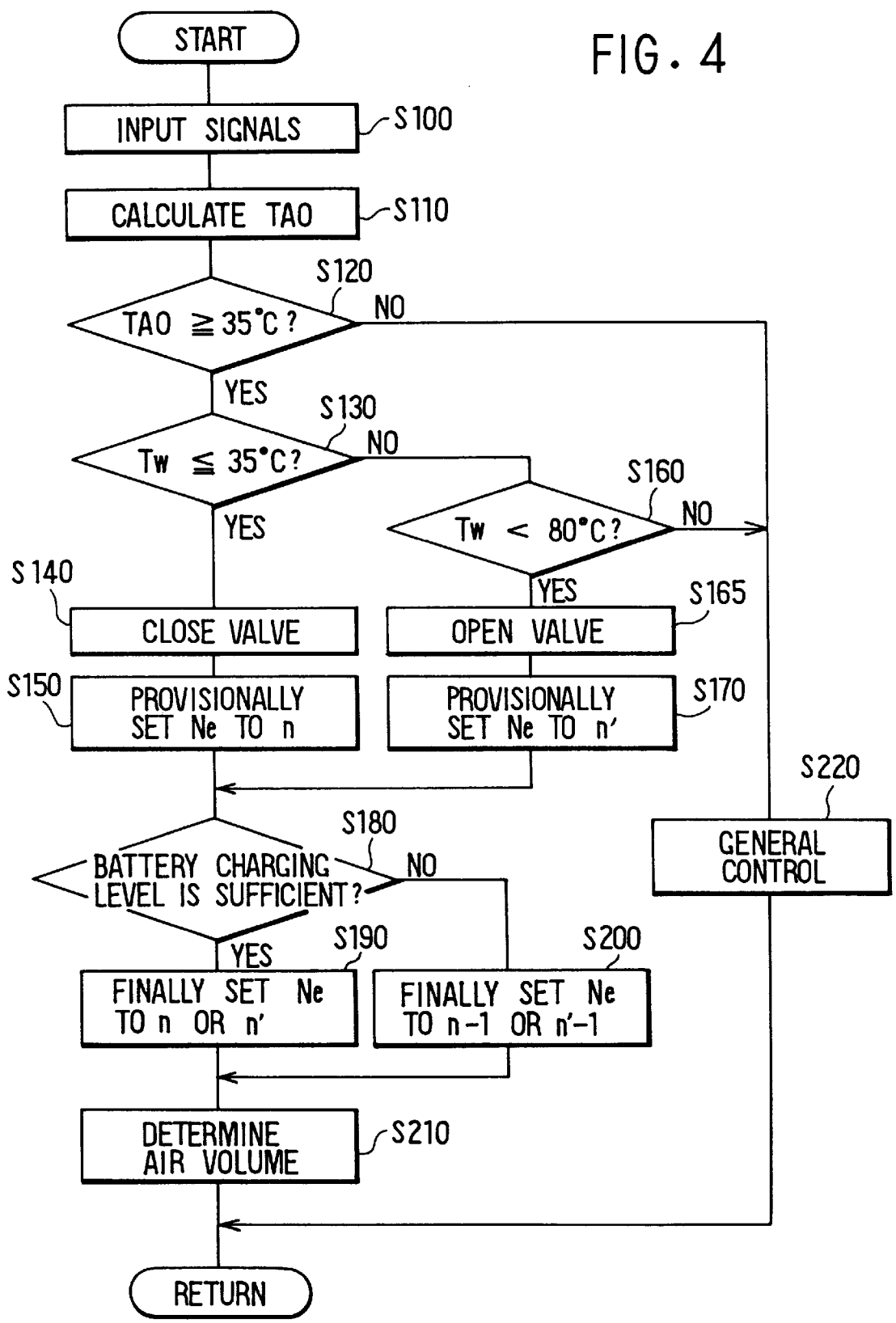

AIR CONDITIONING APPARATUS HAVING ELECTRIC HEATING MEMBER INTEGRATED WITH HEAT EXCHANGER

CROSS-REFERENCE TO RELATED APPLICATION

This application is related to and claims priorities from Japanese Patent Applications No. Hei. 9-358231 filed on Dec. 25, 1997, and No. Hei. 10-285485 filed on Oct. 7, 1998, the contents of which are hereby incorporated by reference.

BACKGROUND OF THE INVENTION

1. Field of the Invention

The present invention relates to an air conditioning apparatus for a vehicle, which includes a heating heat exchanger and electric heating members integrated with the heating heat exchanger. More particularly, the present invention relates to a control unit for controlling a heat-radiating amount of the electric heating members and an amount of air blown from a blower.

2. Description of Related Art

In recent years, it is desired to improve an efficiency of an engine in an engine compartment. When the efficiency of the engine is improved, load applied to the engine is decreased, and cooling water for cooling the engine can not be sufficiently heated. Therefore, in a hot-water type air conditioning apparatus where air blown into a passenger compartment is heated using the engine cooling water, there is a problem that heating capacity for the passenger compartment is insufficient.

In a conventional heating device described in JP-A-9-20129, an electric member is attached to an air-flow inlet surface of a heating heat exchanger, and electric power is supplied to the electric member when the temperature of hot water flowing into the heating heat exchanger is low. Further, temperature of a passenger compartment and passed time after turning on the electric member are measured, and heat-radiating amont of the electric member is gradually decreased as the temperature of the passenger compartment and the passed time are increased. However, in the conventional cooling device, because a large amount of air is blown into the passenger compartment, the temperature of air blown into the passenger compartment is not increased sufficiently in cold winter even when the heat-radiating amont of the electric member becomes maximum.

On the other hand, in the conventional heating device, because the electric member is attached to the air-flow inlet surface of the heating heat exchanger, heat generated from the electric member is transmitted to hot water (engine-cooling water) flowing in the heating heat exchanger, and air passing through the electric member is not effectively heated by using heat generated from the electric member. Thus, the temperature of air blown into the passenger compartment is not heated sufficiently quickly using the electric member.

SUMMARY OF THE INVENTION

In view of the foregoing problems, it is an object of the present invention to provide an air conditioning apparatus for a vehicle, in which air blown into a passenger compartment of the vehicle is effectively quickly heated by using an electric unit.

According to a first aspect of the present invention, an air conditioning apparatus for a vehicle includes a heat exchanger for heating air passing therethrough using a fluid flowing through the heat exchanger as a heating source, an electric unit for heating air to be blown into the passenger compartment, and a control unit for controlling electric power supplied to the electric unit and an amount of air blown from a blower. The amount of air blown from the blower is controlled according to a heat-radiating amount of the electric unit and a target temperature of air blown into the passenger compartment. That is, the amount of air blown from the blower is increased when the heat-radiating amount from the electric unit is increased, and the amount of air blown from the blower is decreased when the heat-radiating amount from the electric unit is decreased, so that the temperature of air blown into the passenger compartment can be set to the target temperature. Accordingly, even when the heat-radiating amount from the electric unit is changed, the temperature of air blown into the passenger compartment can be set to the target temperature while pleasant heating is given to a passenger in the passenger compartment. As a result, the passenger compartment can be effectively quickly heated using the electric unit. Further, because the amount of air blown into the passenger compartment is automatically changed, it is not necessary to change an air-blowing level by a passenger in the passenger compartment.

Preferably, the heat-radiating amount of the electric unit is controlled by a temperature of the fluid and a charged level of a battery of the vehicle. That is, the control unit provisionally sets the heat-radiating amount of the electric unit to a first predetermined amount based on the temperature of the fluid flowing into the heat exchanger. Further, the control unit finally sets the heat-radiating amount of the electric unit to the first predetermined amount when the charged level of the battery is sufficient, and the control unit finally sets the heat-radiating amount of the electric unit to a second predetermined amount smaller than the first predetermined amount when the charged level of the battery is insufficient. Thus, the heat-radiating amount of the electric unit can be controlled while over-discharging of the battery of the vehicle can be effectively prevented.

More preferably, when the temperature of the fluid is lower than a first predetermined temperature during heating operation of the passenger compartment, a valve interrupts the fluid flowing into the heat exchanger, the electric unit is turned on, and the blower is operated. Therefore, it can prevent heat generated from the electric unit from being transmitted to the fluid having a lower temperature. Thus, the passenger compartment can be effectively heated using the electric unit. Further, because the electric unit is composed of a plurality of electric heating members integrated with a core portion of the heat exchanger, the control of the heat-radiating amount of the electric unit can be made simple.

According to a second aspect of the present invention, in an air conditioning apparatus for a vehicle, a control unit controls electric power supplying to an electric unit to control a heat-radiating amount from the electric unit, and controls an amount of air blown from a blower according to the heat-radiating amount of the electric unit and a temperature of fluid flowing into a heat exchanger. Therefore, even when the heat-radiating amount of the electric unit and the temperature of the fluid are changed, temperature of air blown into a passenger compartment of the vehicle can be increased to a target temperature by controlling the amount of air blown from the blower, the passenger compartment can be effectively quickly increased using the electric unit.

BRIEF DESCRIPTION OF THE DRAWINGS

Additional objects and advantages of the present invention will be more readily apparent from the following detailed description of preferred embodiments when taken together with the accompanying drawings, in which:

FIG. 4 is a flow diagram showing an electric control of the electric control unit according to the first embodiment;

FIG. 6 is a graph showing the relationship between temperature (Tw) of hot water flowing into the heating heat exchanger and number (Ne) of electric heating members to be turned on;

DETAILED DESCRIPTION OF THE PRESENTLY PREFERRED EMBODIMENTS

Preferred embodiments of the present invention are described hereinafter with reference to the accompanying drawings.

Figure 1:
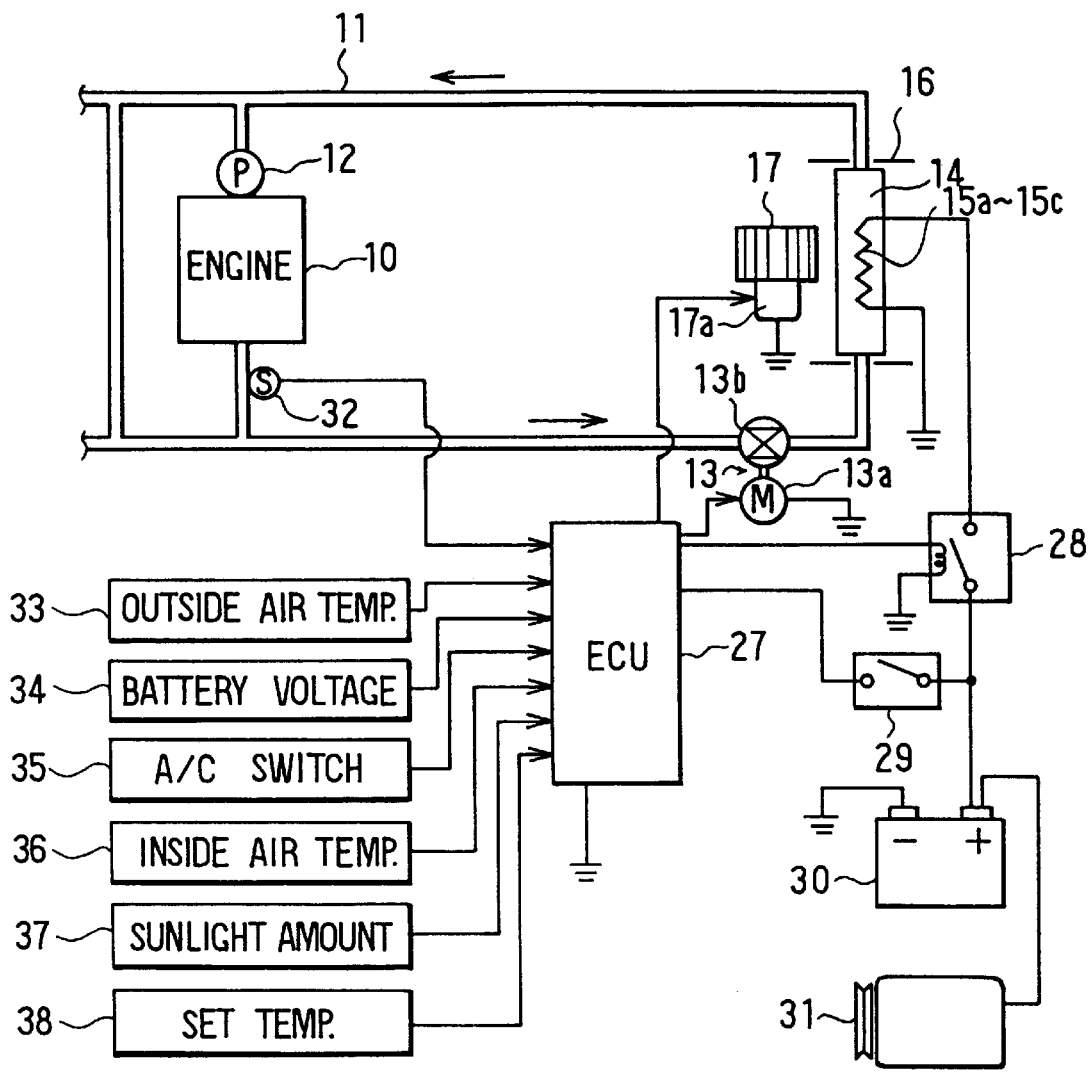
FIG. 1 is a schematic diagram showing a water circuit of a heating heat exchanger and an electronic control unit of an air conditioning apparatus according to a first preferred embodiment of the present invention.

A first preferred embodiment of the present invention will be now described with reference to FIGS. 1–8. As shown in FIG. 1, a water pump 12 driven by an engine 10 of a vehicle is provided in a water circuit 11, and hot water circulates in the water circuit 11 by operating the water pump 12. Hot water heated in the engine 10 flows into a heating heat exchanger 14 of an air conditioning apparatus through a hot water valve 13. The hot water valve 13 includes an electric actuator 13a such as a servomotor, and a valve body 13b driven by the electric actuator 13a to adjust an opening degree of a water passage. Further, three electric heating members 15a–15c are integrated with the heating heat exchanger 14, and the heating heat exchanger 14 is contained in an air conditioning case 16 to heat air passing therethrough using hot water or the electric heating members 15a–15c as heating source.

Figure 2:
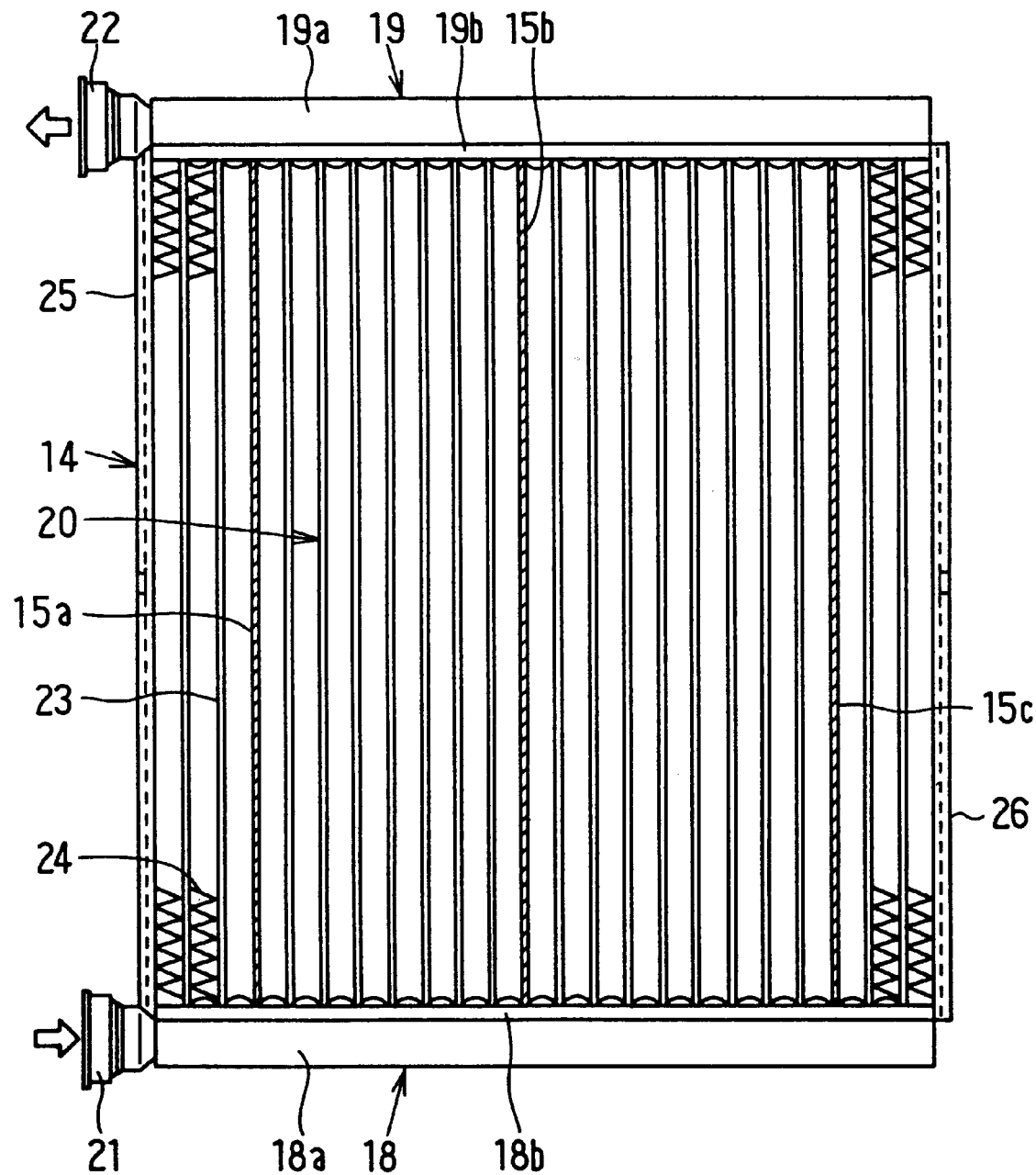
FIG. 2 is a front view of the heating heat exchanger in FIG. 1.

As shown in FIG. 2, the heating heat exchanger 14 includes a first tank 18 at a hot water inlet side, a second tank 19 at a hot water outlet side, and a core portion 20 disposed between the first and second tanks 18, 19. An inlet pipe 21 through which hot water (i.e., engine cooling water) from the engine 10 of the vehicle flows into the first tank 18 is provided at one side of the first tank 18, and an outlet pipe 22 through which the hot water having been heat-exchanged with air returns to the engine 10 is provided at one side of the second tank 19, as shown in FIG. 2. In the first embodiment, the first tank 18 is provided at a lower side of the heating heat exchanger 14, and the second tank 19 is provided at an upper side thereof. However, the first tank 18 may be provided at an upper side of the heat exchanger 14, and the second tank 19 may be provided at a lower side thereof.

The first tank 18 includes a first tank portion 18a, and a first sheet portion 18b for closing an opened end of the first tank portion 18a. The second tank 19 includes a second tank portion 19a, and a second sheet portion 19b for closing an opened end of the second tank portion 19a. Each of the first and second tanks 18, 19 extends in a right-left direction in FIG. 2. A plurality of tube insertion holes, each of which is formed in a flat-tube shape in cross-section, are provided in each sheet portion 18b, 19b in series.

The core portion 20 includes a plurality of flat tubes 23 arranged in the right-left direction in FIG. 2. Each flat surface of the flat tubes 23 is provided to be parallel to a flow direction (i.e., face-back direction in FIG. 2) of air passing through of the core portion 20. Hot water flows through the flat tubes 23 in one way from a lower side to an upper side in FIG. 2. A plurality corrugated fins 24 each of which is formed into a wave shape are connected between each adjacent flat tubes 23. Each corrugated fin 7 has a plurality of louvers which are inclined relative to the flow direction of air passing through the core portion 20 by a predetermined angle. By forming the louvers in each corrugate fin 20, heat-exchanging performance of the core portion 20 is improved. Each both ends of the flat tubes 23 are inserted into the tube insertion holes of the sheet portions 18b, 19b so that the flat tubes 23 are air-tightly connected to the sheet portions 18b, 19b of the first and second tanks 18, 19. Side plates 25, 26 are disposed respectively at right and left sides of the most right corrugate fin 24 and the most left corrugate fin 24 of the core portion 20 to be connected to the most right corrugate fin 24, the most left corrugate fin 24 and the sheet portions 18b, 19b of the first and second tanks 18, 19.

Electric heating members 15a–15c are disposed in the core portion 20 instead of a part of the flat tubes 23. As shown in FIG. 2, in the first embodiment, the three electric heating members 15a, 15b, 15c are disposed symmetrically in the right-left direction. That is, a distance between the electric heating members 15a, 15b is equal to that between the electric heating members 15b, 15c in the right-left direction in FIG. 2. For example, both holding plates (not shown) extending in a longitudinal direction of the flat tube 23 are connected to adjacent corrugate fins 24 where the electric heating members 15a–15c are provided, and are disposed to have a predetermined distance therebetween. The predetermined distance corresponds to each thickness of the electric heating member 15a–15c, and each electric heating member 15a–15c is inserted between the holding plates.

In the first embodiment, the heating heat exchanger 14 except for the electric heating members 15a–15c is made of aluminum (including aluminum alloy). Each of the electric heating members 15a–15c includes a plate-like heat generating element and thin plate-like electrode plates disposed at both sides of the heat generating element. That is, the heat generating element is inserted between the electrode plates to form a three-layered structure. A cover member made of an electric-insulating material is covered around the electrode plates. Specifically, the cover member is made of an electric-insulating resin having a high heat resistance, such as polyimide resin. The heat generating element is a PTC heater element having positive resistance temperature characteristics in which a value of the resistance thereof increases suddenly at a predetermined temperature, that is, at the Curie point. Both the electrode plates of the heat generating element are made of electrically conductive metal such as aluminum, copper, stainless steel. In the first embodiment or the three electric heating member 15a–15c are connected in parallel relative to a battery 30 of the vehicle in FIG. 1.

Next, an electric control of the three electric heating members 15a–15c will be now described. An electronic control unit (ECU) 27 includes a microcomputer, and controls the electric heating members 15a–15c based on a pre-set program. Signals from the ECU 27 are output to a relay 28. In FIG. 1, only the single relay 28 is indicated. However, actually, three relays are provided to correspond to the three electric heating members 15a–15c. That is, the three electric heating members 15a–15c are respectively independently controlled using the three relays.

An ignition switch 29 for switching an operation of the engine 10 is provided, and electric power from the battery 30 of the vehicle is supplied to the ECU 27 through the ignition switch 29. An alternator 31 is connected to the battery 30, and the battery 30 is charged by the alternator 31.

On the other hand, signals from sensor and switch groups are input to the ECU 27. That is, the sensor and switch groups include a water temperature sensor 32 for detecting a temperature of hot water in the engine 10, an outside air temperature sensor 33 for detecting an outside air temperature Ta, a battery voltage sensor 34 for detecting a voltage charged in the battery 30, an air-conditioning operation switch (e.g., air blowing switch) 35, an inside air temperature sensor 36 for detecting an inside air temperature of the passenger compartment, a sunlight amount sensor 37 for detecting an amount of sunlight entering into the passenger compartment, and a temperature setting switch 38 for setting a temperature of the passenger compartment.

Here, a ventilation system of the air conditioning apparatus will be now described with reference to FIG. 3. The air conditioning apparatus includes the air conditioning case 16 for forming an air passage, an inside/outside air switching box 39 for introducing inside air and outside air, a blower 17 for blowing air introduced from the inside/outside air switching box 39 into the air conditioning case 16, a cooling heat exchanger 40 (i.e., evaporator) for cooling air passing therethrough, and the heating heat exchanger 14 disposed at a downstream air side of the cooling heat exchanger 40. The blower 17 is driven by a driving motor 17a, and air blown from the blower 17 is cooled and dehumidified by the cooling heat exchanger 40. The heating heat exchanger 14 is disposed to form a bypass passage 42, and an amount of air passing through the bypass passage 42 and an amount of air passing through the heating heat exchanger 14 are adjusted by an air mixing door 41. The air mixing door 41 is rotated to a rotation position so that the temperature of air blown into the passenger compartment is controlled. When a maximum heating state is set, the air mixing door 41 is rotated to a rotation position 41a to close the bypass passage 42 and to fully open the heating heat exchanger 14. Air from the heating heat exchanger 14 and air from the bypass passage 42 are mixed in an air mixing chamber 43 to have a predetermined temperature. The air conditioning case 16 has a defroster opening 47 for blowing air toward an inner surface of a windshield, a face opening 48 for blowing air toward an upper side in the passenger compartment, and a foot opening 49 for blowing air toward a lower side in the passenger compartment. The defroster opening 47, the face opening 48 and the foot opening 49 are opened and closed by air outlet mode selecting doors 44–46, respectively.

Figure 3:
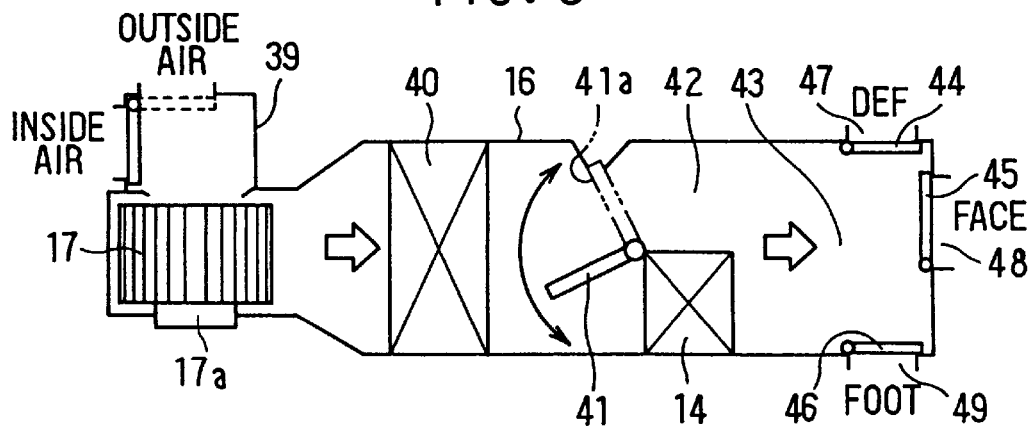
FIG. 3 is a schematic diagram showing a ventilation system of the air conditioning apparatus for a vehicle according to the first embodiment.

When heating operation is performed for the passenger compartment, the blower 17 shown in FIG. 3 is operated, and air passes through between the flat tubes 23 and the corrugated fins 24 of the heating heat exchanger. On the other hand, the water pump 12 of the engine 10 is operated, and the hot water valve 13 is opened, so that hot water from the engine 10 flows into the first tank 18 of the heating heat exchanger 14 from the inlet pipe 21. The hot water in the first tank 18 is distributed into the flat tubes 23. Therefore, air passing through the core portion 20 is heated by the hot water flowing through the flat tubes 23. The hot water having passed through the flat tubes 23 flows into the second tank 19, and flows toward the outside from the outlet pipe 22 to return to the engine 10.

In the heating operation, when the temperature of hot water flowing into the heating heat exchanger 14 is low and heat generated in the electric heating members 15a–15c is necessary, the relay 28 is turned on, and electric power is supplied from the battery 30 to the electric heating members 15a–15c. Therefore, heat is radiated from the electric heating members 15a–15c. Heat radiated from the electric heating members 15a–15c is transmitted to the corrugated fins 24 provided at both sides of each electric heating member 15a–15c, and is further transmitted to air passing through the corrugated fins 24. Therefore, even when hot water flowing through the heating heat exchanger 14 has a low temperature, air blown into the passenger compartment can be readily quickly heated using the electric heating members 15a–15c.

Because the heat generating element of the electric heating members 15a–15c is the PTC element having positive resistance temperature characteristics in which the resistance value increases suddenly at the Curie point, the generated-heat of the heat generating element can be controlled by itself at the Curie point.

In the heating operation, when the temperature of hot water is low, air blown into the passenger compartment is heated by heat generated from the electric heating members 15a–15c. However, the temperature of air blown into the passenger compartment is greatly changed according to the amount of air blown from the blower 17. Further, when the amount of heat transmitted from the electric heating members 15a–15c to the water is increased, heat generated in the electric heating members 15a–15c is not effectively used for heating air blown into the passenger compartment; and therefore, heating performance of the electric heating members 15a–15c, for effectively rapidly heating the passenger compartment, is decreased. In the first embodiment, to improve the heating performance of the electric heating members 15a–15c, the air conditioning apparatus is operated based on a control routine shown in FIG. 4.

The control routine shown in FIG. 4 is started when the ignition switch 29 of the engine 10 and the air-conditioning operation switch 35 are turned on. Signals from each sensor and each switch are input at step S100. Next, at step S110, a target air temperature (TAO) of air blown into the passenger compartment is calculated based on the following formula (1) pre-stored in ROM of the ECU 27.

$$TAO = Kset \times Tset - Kr \times Tr - Kam \times Tam - Ks \times Ts + C \qquad (1)$$

wherein, Kset is a temperature setting gain, Tset is a temperature set by the temperature setting switch 38, Kr is an inside air temperature gain, Tr is an inside air temperature detected by the inside air temperature sensor 36, Kam is an outside air temperature gain, Tam is an outside air temperature detected by the outside air temperature sensor 33, Ks is a sunlight gain, Ts is an amount of sunlight, detected by the sunlight sensor 37, and C is a correction constant.

Next, at step S120, it is determined whether or not the target air temperature (TAO) is equal to or higher than 35° C. (i.e., TAO≧35° C.). That is, when TAO≧35° C. at step S120, it is determined that the maximum heating state (warm-up state) is necessary in a heating start time of the heating operation. Therefore, in an air conditioning apparatus with a manual operation, it may be determined whether or not the air mixing door 41 is in the maximum heating position (i.e., the chain line position 41a) at step S120.

When the maximum heating state (warm-up state) is determined at step S120, it is determined whether or not the water temperature Tw detected by the water temperature sensor 32 is equal to or lower than a first predetermined temperature (e.g., 35° C.). The determination at step S130 is performed to prevent heat generated from the electric heating members 15a–15c from being transmitted to the water having a low temperature. When the water temperature Tw is lower than the first predetermined temperature (e.g., Tw≧35° C.), the hot water valve 13 is closed at step S140, and the number (Ne) of the electric heating members 15a–15c to be turned on is provisionally set to the maximum number "n" (i.e., n=3, in the first embodiment) at step S150.

Figure 5:
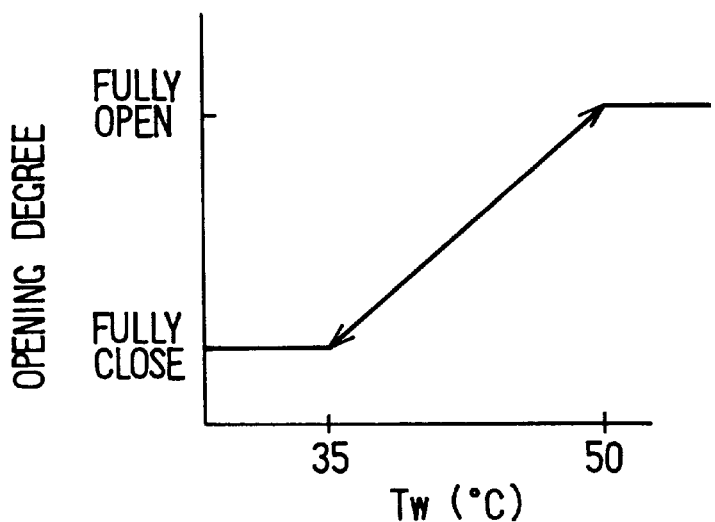
FIG. 5 is a graph showing control characteristic of a hot water valve according to the first embodiment.
Figure 6:
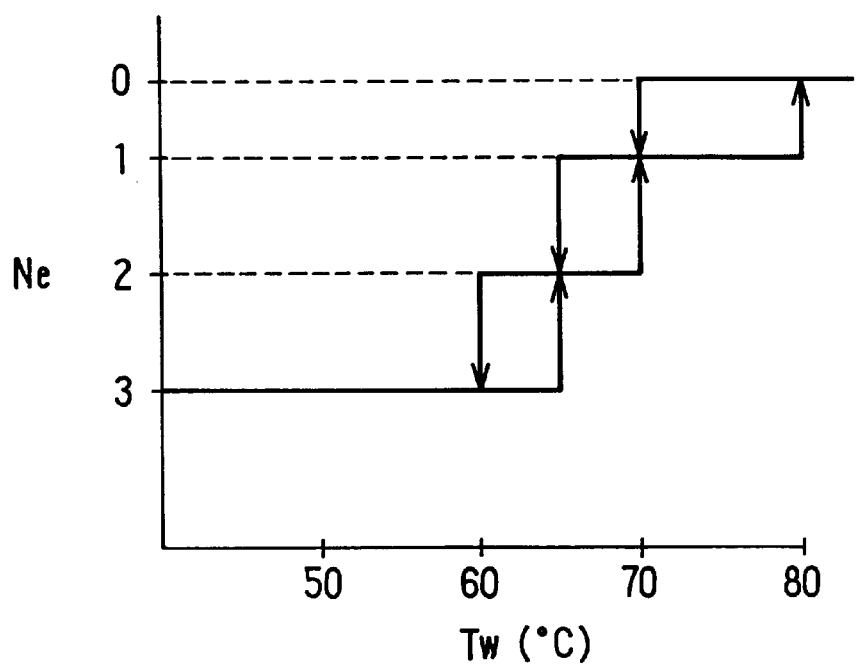

On the other hand, when the water temperature Tw is higher than the first predetermined temperature (e.g., Tw>35° C.) at step S130, it is determined whether or not the water temperature Tw is lower than a second predetermined temperature (e.g., 80° C.) at step S160. When the water temperature Tw is lower than the second predetermined temperature (e.g., 80° C.) and is higher than the first predetermined temperature (e.g., 35° C.), the hot water valve 13 is opened at step S165. At step S165, the hot water valve 13 is controlled based on the control characteristic shown in FIG. 5. That is, as shown in FIG. 5, an opening degree of the hot water valve 13 is gradually increased as the water temperature Tw increases, and the hot water valve 13 is fully opened when the water temperature Tw becomes equal to 50° C. Because the opening degree of the hot water valve 13 is gradually increased, it can prevent the temperature of air blown from the heating heat exchanger 14 from being suddenly increased. Further, at step S170, the number (Ne) of electric heating members 15a–15c to be turned on is provisionally set to "n'" according to the water temperature Tw based on the graph shown in FIG. 6. That is, as shown in FIG. 6, when the water temperature Tw is lower than 65° C. (i.e., Tw<65° C.), the number (Ne) of the electric heating members 15a–15c is provisionally set to 3. When the water temperature Tw is in a range of 60° C.–70° C. (i.e., 60° C.≦Tw<70° C.), the number (Ne) is provisionally set to 2. When the water temperature Tw is in a range of 70° C.–80° C. (i.e., 70° C.≦Tw<80° C.), the number (Ne) is provisionally set to 1.

Figure 7:
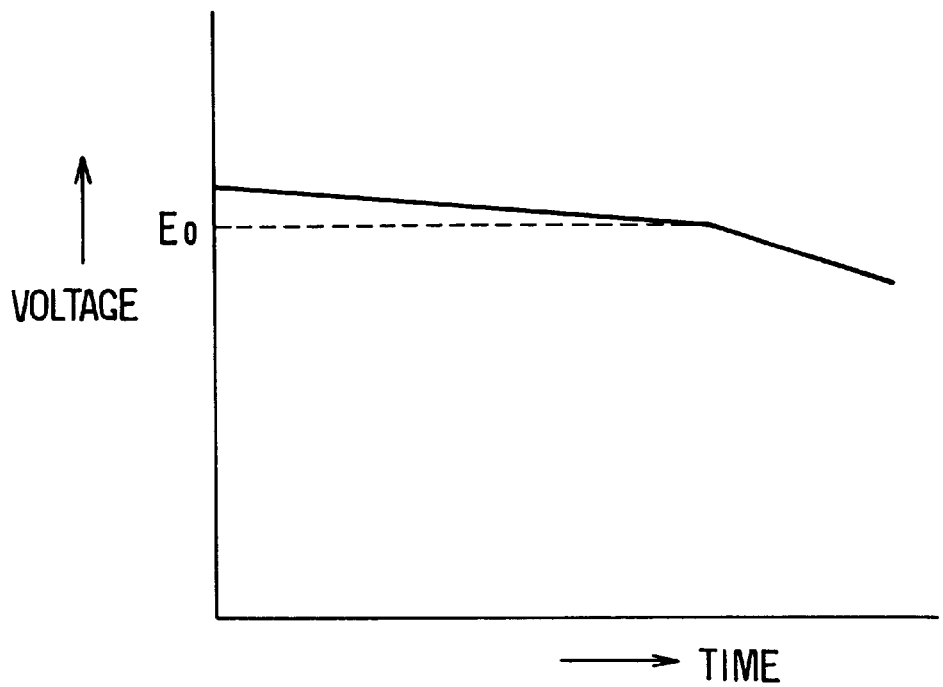
FIG. 7 is a graph showing control characteristic of voltage of a battery mounted on the vehicle according to the first embodiment.

After step S150 or step S170, it is determined whether or not a battery charging level of the battery 30 is sufficient according to a signal from the battery voltage sensor 34 at step S180. As shown in FIG. 7, when the battery 30 is used in over load state, the voltage of the battery 30 is gradually decreased as using time becomes longer, and a voltage-decrease grade becomes larger after the voltage of the battery 30 is decreased to a predetermined voltage $E_o$. Thus, in the first embodiment, the determination whether or not the voltage of the battery 30 is larger than the predetermined voltage $E_o$ is performed based on signals detected from the battery voltage sensor 34. That is, when the voltage of the battery 30 is larger than the predetermined voltage $E_o$, it is determined that the battery charging level of the battery 30 is sufficient. When the voltage of the battery 30 is lower than the predetermined $E_0$, it is determined that the battery charging level is insufficient.

When it is determined that the battery charging level is sufficient at step S180, the number (Ne) of the electric heating members 15a–15c to be turned on is finally set to the provisionally set number "n" or "n'" set at step S150 or S170. On the other hand, when it is determined that the battery charging level is insufficient at step S180, the number (Ne) of the electric heating member 15a–15c to be turned on is finally set to "n–1" or "n'–1" relative to the provisionally set number "n" or "n'" at step S150 or S170. In the first embodiment, because the number (Ne) is finally set to "n–1" or "n'–1" when the battery charging level of the battery 30 is insufficient, the over-charging of the battery 30 can be prevented.

Next, at step S210, an air volume Va (i.e., air flow amount) blown by the blower 17 is determined based on the number (Ne) of the electric heating members 15a–15c to be turned on and a lowest target temperature (To). Here, the determination of the amount of air blown by the blower 17 is described in detail. As a result of experiment by the inventors of the present invention, when the water temperature Tw is not higher than the first predetermined temperature (i.e., Tw≦35° C.) at the heating start time (i.e., warm-up state) in the winter, the temperature of air blown into the passenger compartment is necessary to be higher than 38–45° C., for giving pleasant heating to the passenger in the passenger compartment.

Figure 8:
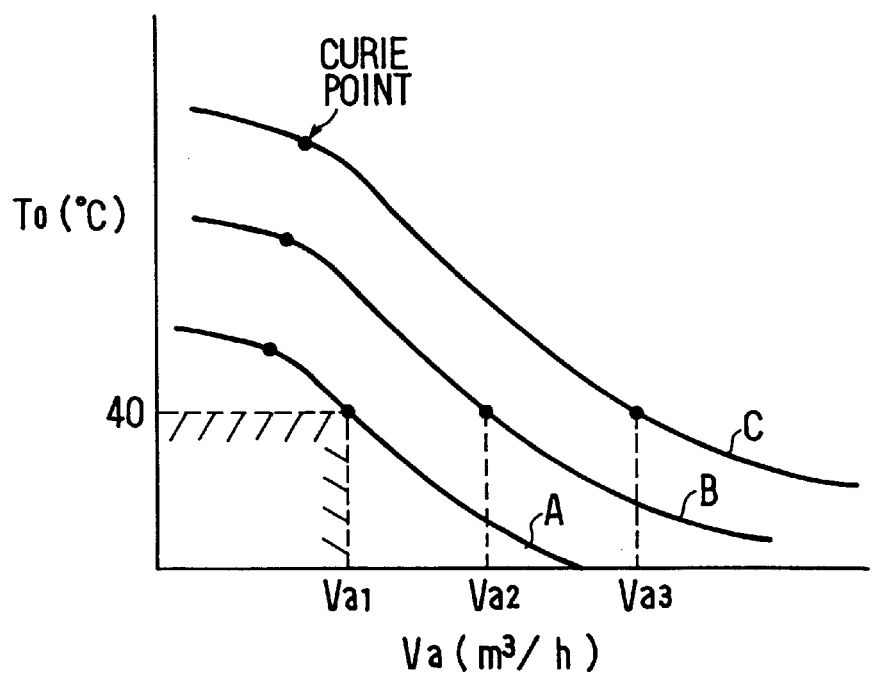
FIG. 8 is a graph showing control characteristic of an amount of air blown into a passenger compartment according to the first embodiment.

Thus, in the first embodiment, when the water temperature Tw is not higher than the first predetermined temperature (i.e., Tw≦35° C.) at the heating start time (i.e., warm-up state) in the winter, the lowest target air temperature To is set to 40° C., and the air volume Va blown by the blower 17 is determined based on the graph shown in FIG. 8, so that the temperature of air blown into the passenger compartment is set to the lowest target temperature To. That is, when the number (Ne) of the electric heating member 15a–15c to be turned on is set to 1 as shown by graph A in FIG. 8, the air volume Va is set to Va1 (i.e., Va=Va1). When the number (Ne) of the electric heating member 15a–15c to be turned on is set to 2 as shown by graph B in FIG. 8, the air volume Va is set to Va2 (i.e., Va=Va2). When the number (Ne) of the electric heating member 15a–15c to be turned on is set to 3 as shown by graph C in FIG. 8, the air volume Va is set to Va3 (i.e., Va=Va3). Here, the air volume Va1, Va2, Va3 has the relationship of Va1<Va2<Va3.

As shown in FIG. 4, when the water temperature Tw is not higher than the first predetermined temperature (i.e., Tw≦35° C.), the number (Ne) of the electric heating members 15a–15c to be turned on is finally set to 3 when the battery charging level is sufficient, or the number (Ne) of the electric heating members 15a–15c to be turned on is finally set to 2 when the battery charging level is insufficient. In this case, the battery charging level of the battery 30 may be divided into plural steps, and the number (Ne) may be reduced to 1 or 0 in order as the battery charging level reduces.

When the water temperature Tw is not higher than the first predetermined temperature (i.e., Tw≦35° C.), the number (Ne) of the electric heating members 15a–15c to be turned on is reduced in order from 3 shown by graph C to 1 shown by graph A in FIG. 8 as the battery charging level of the battery 30 becomes smaller. Further, in the low water temperature of Tw≦35° C., the air volume (Va) blown by the blower 17 is determined based on the number (Ne) of the electric heating members 15a–15c to be turned on and the lowest target air temperature To. Therefore, the temperature of air blown into the passenger compartment is not decreased due to a large amount of air from the blower 17 when the electric heating members 15a–15c are turned on, and is increased to the lowest target air temperature To.

Thus, even when the water temperature Tw is low in the warm-up state, the passenger compartment is rapidly heated by the heat generated from the electric heating members 15a–15c without giving unpleasant heating to the passenger in the passenger compartment. Further, even in the warm-up state, because the operation of the blower 17 is not stopped, the passenger compartment can be quickly heated using the electric heating members 15a–15c at the heating start time. In the first embodiment, because the amount of air blown by the blower 17 can be automatically determined, it is not necessary to switch air volume by a passenger in the passenger compartment.

During the heating operation in the winter, the heating of the passenger compartment is performed generally by introducing outside air to prevent the windshield from being frosted. Therefore, the temperature of air blown into the passenger compartment is changed according to the outside air temperature. Thus, preferably, the air volume Va of the blower 17 is controlled to be decreased as the outside air temperature decreases.

On the other hand, after the water temperature Tw is increased to be higher than 35° C., the temperature of air blown into the passenger compartment is increased by using heat radiated from the hot water flowing through the heating heat exchanger 14 and heat radiated from the electric heating members 15a–15c. Therefore, after the water temperature Tw is increased to be higher than 35° C. (i.e., Tw>35° C.), the air volume Va of the blower 17 is determined based on the number (Ne) of the electric heating members 15a–15c to be turned on, and the water temperature Tw. In this case, even when the number (Ne) is gradually reduced in this order 3→2→1→0 according to an increase of the water temperature Tw, the air volume Va of the blower 17 is gradually increased as the water temperature Tw increases, because the increase ratio of heat-radiating amount from the hot water becomes larger.

At step S120 in FIG. 4, when the target air temperature TAO is lower than 35° C., it is determined that the maximum heating state is not necessary, and a general control is performed at step S220. That is, all the electric heating members 15a–15c are turned off, and the hot water valve 13 is opened at step S220. Further, at step S160, when the water temperature Tw is higher than 80° C., the temperature of air blown into the passenger compartment is sufficiently heated only using hot water, all the electric heating members 15a–15c are turned off at step S220. Thus, at step S220, the amount of air blown from the blower 17 is controlled using a general method. That is, the air volume of the blower 17 is controlled by changing a voltage level applied to the driving motor 17a of the blower 17 or by changing a pulse width of pulse output voltage applied to the driving motor 17a of the blower 17.

Figure 9:
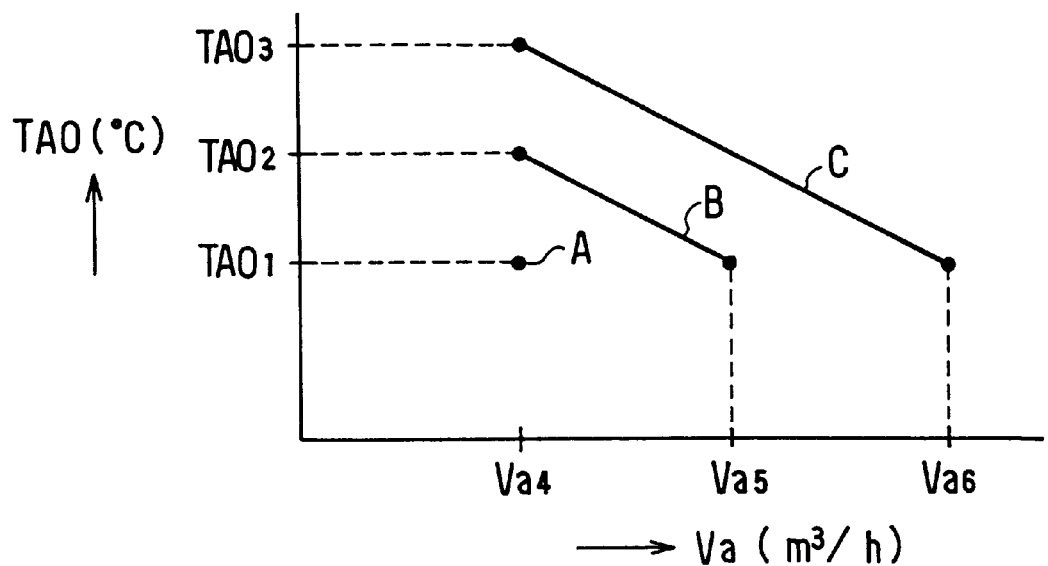
FIG. 9 is a graph showing control characteristic of the amount of air blown into the passenger compartment according to a second preferred embodiment of the present invention.

A second preferred embodiment of the present invention will be now described with reference to FIG. 9. In the above-described first embodiment, when the water temperature Tw is not higher than the first predetermined temperature (i.e., Tw≦35° C.) in the heating start time, the lowest target temperature To is set to the predetermined temperature (e.g., To=40° C.), and the air volume Va of the blower 17 is determined so that the predetermined lowest target temperature To is obtained. However, in the second embodiment, as shown in FIG. 9, the air volume Va of the blower 17 is determined based on the target air temperature TAO calculated at step S110 and the number (Ne) of the electric heating members 15a–15c to be turned on. In FIG. 9, graph A indicates the number (Ne) of 1, graph B indicates the number (Ne) of 2, and graph C indicates the number (Ne) of 3.

For example, in a case where the number (Ne) of the electric heating members 15a–15c to be turned on is 3 as shown by graph C in FIG. 9, when the target air temperature TAO is increased from TAO1 to TAO3, the air volume Va is decreased from Va6 to Va4. Because the air volume Va is decreased from the Va6 to the Va4 according to the increase of the target air temperature TAO, the temperature of air blown into the passenger compartment is increased to correspond to the target air temperature TAO3. Similarly, in a case where the number (Ne) of the electric heating members 15a–15c to be turned on is 2 as shown by graph B in FIG. 9, when the target air temperature TAO is increased from TAO0 to TAO2, the air volume Va is decreased from Va5 to Va4. Because the air volume Va is decreased from the Va5 to the Va4 according to the increase of the target air temperature TAO, the temperature of air blown into the passenger compartment is increased to correspond to the target air temperature TAO2. Further, when the number (Ne) of the electric heating members 15a–15c to be turned on is 1 as shown by A in FIG. 9, the air volume of the blower 17 is set to Va4, so that the temperature of air blown into the passenger compartment can be increased to correspond to the target air temperature TAO1. In the second embodiment, because the TAO1 is a temperature corresponding to the predetermined temperature of 35° C., all the electric heating members 15a–15c are turned off when TAO≦TA01.

A third preferred embodiment of the present invention will be now described with reference to FIG. 10. In the third embodiment, the air volume Va of the blower 17 is determined based on the water temperature Tw and the number (Ne) of the electric heating members 15a–15c to be turned on. That is, the temperature of air blown into the passenger compartment is determined by a total heat-radiating amount from the hot water flowing through the heating heat exchanger 14 and the electric heating members 15a–15c. Further, the heat-radiating amount from the hot water is determined by the water temperature Tw, and the heat-radiating amount from the electric heating member 15a–15c is determined by the number (Ne) of the electric heating member 15a–15c to be turned on. Thus, in the third embodiment, the air volume Va is determined based on the water temperature Tw and the number (Ne) so that the temperature of air blown into the passenger compartment is controlled to a predetermined temperature.

Figure 10:
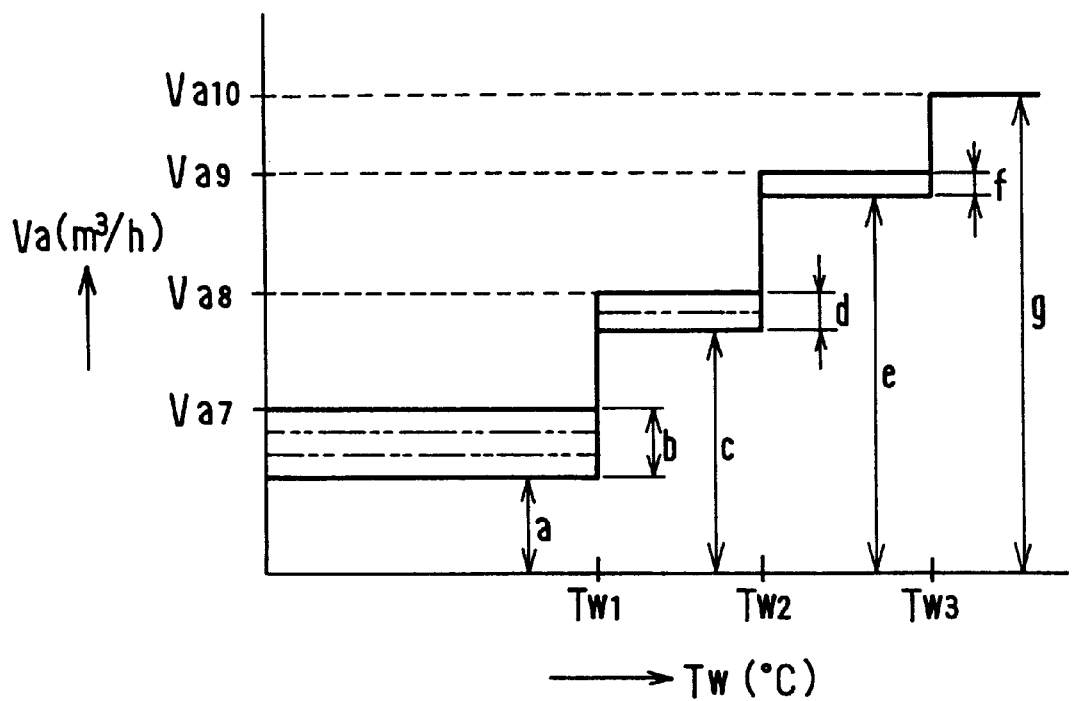
FIG. 10 is a graph showing control characteristic of the amount of air blown into the passenger compartment according to a third preferred embodiment of the present invention.

As shown in FIG. 10, when the water temperature Tw is lower than a first set temperature Tw1 (e.g., 60° C.), a total air volume Va7 including an air volume "a" corresponding to the heat-radiating amount of the hot water and an air volume "b" corresponding to the heat-radiating amount of the three electric heating members 15a–15c is determined. When the water temperature Tw is in a range between the first set temperature Tw1 and a second set temperature Tw2 (e.g., 70° C.), a total air volume Va8 including an air volume "c" corresponding to the heat-radiating amount of the hot water and an air volume "d" corresponding to the heat-radiating amount of the two electric heating members 15a–15c is determined. Further, when the water temperature Tw is in a range between the second set temperature Tw2 and a third set temperature Tw3 (e.g., 80° C.), a total air volume Va9 including an air volume "e" corresponding to the heat-radiating amount of the hot water and an air volume "f" corresponding to the heat-radiating amount of the one electric heating members 15a–15c is determined. Further, when the water temperature Tw is higher than the third set temperature Tw3, all the three electric heating members 15a–15c are turned off, and a total air volume Va10 is determined based on only an air volume "g" corresponding to the heat-radiating amount of the hot water. According to the third embodiment of the present invention, the amount of air blown from the blower 17 is controlled based on the water temperature Tw and the number (Ne) of the electric heating members 15a–15c to be turned on so that the temperature of air blown into the passenger compartment is increased to a predetermined temperature. The air volume Va is set to a small value (Va=Va7) when the total heat-radiating amount from the hot water and the electric heating members 15a–15c is small, and the air volume Va is increased stepwise from the Va7 to Va10.

Further, even when the water temperature Tw is lower than the first set temperature Tw1 (e.g., 60° C.), the number (Ne) of the electric heating members 15a–15c can be reduced according to the battery charging level of the battery 30. In this case, according to the reduce of the number (Ne), the air volume Va7 is reduced in order as shown by the chained line in FIG. 10. Therefore, the temperature of air blown into the passenger compartment can be set to be higher than the predetermined temperature, the heating performance of the passenger compartment can be improved at the heating start time (i.e., warm-up state).

Figure 11:
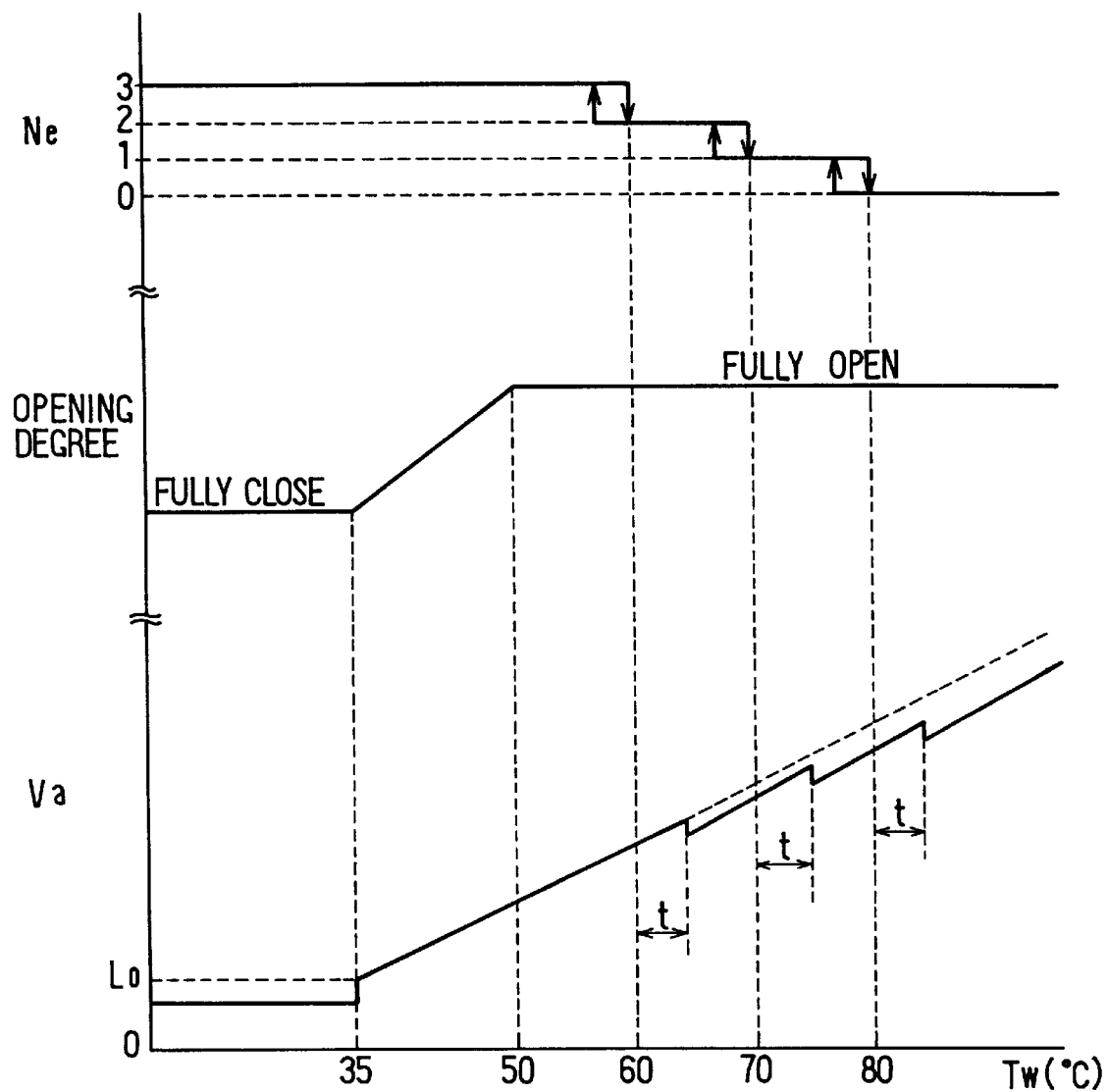
FIG. 11 is a graph showing control characteristic of the amount of air blown into the passenger compartment according to a fourth preferred embodiment of the present invention.

A fourth preferred embodiment of the present invention will be now described with reference to FIG. 11. In the fourth embodiment, the air volume of the blower 17 is controlled based on the water temperature Tw and the number (Ne) of the electric heating members 15a–15c to be turned on, similarly to the third embodiment. In the fourth embodiment, as shown in FIG. 11, when the water temperature Tw is lower than 35° C., the hot water valve 13 is fully closed, the number (Ne) is set to 3, and the air volume Va is set to a low level lower than a lowest level Lo in a general air-conditioning operation. Further, the level of the air volume Va is decreased according to a decrease of the number (Ne) of the electric heating members 15a–15c, so that the temperature of air blown into the passenger compartment is increased to give a sufficient heating to the passenger in the passenger compartment in the heating start time.

As the water temperature Tw increases, the number (Ne) of the electric heating members 15a–15c is reduced in order from three to zero. However, when the level of the air volume Va is reduced immediately after the number (Ne) reduces, the temperature of air blown into the passenger compartment is suddenly increased due to heat capacity of the electric heating members 15a–15c. Therefore, in this case, the level of air volume is not reduced immediately after the number (Ne) reduces. That is, the level of the air amount blown from the blower 17 is reduced, after a predetermined time t is passed after the number (Ne) reduces. Thus, it can prevent the temperature of air blown into the passenger compartment from being suddenly increased when the number (Ne) of the electric heating members 15a–15c is reduced, and the temperature of air blown into the passenger compartment can be smoothly controlled.

Although the present invention has been fully described in connection with preferred embodiments thereof with reference to the accompanying drawings, it is to be noted that various changes and modifications will become apparent to those skilled in the art.

For example, in the above-described embodiments, when the electric heating members 15a–15c are turned on and the water temperature is lower than the first predetermined temperature (e.g., 35° C.), the hot water valve 13 is closed to interrupt the flow of water to the heating heat exchanger 14. However, in the case, the hot water valve 13 may be slightly opened to reduce the amount of water flowing through the heating heat exchanger 14. Further, the present invention may be applied to an air conditioning apparatus where the hot water valve 13 for controlling the flow of hot water flowing into the heating heat exchanger 14 is not provided.

In the above-described embodiments, hot water circulates in the heating heat exchanger 14, and is used as the heating source for heating air. However, oil such as an engine oil may be used instead of the hot water.

In the above-described embodiments, the electric heating members 15a–15c are integrated with the heating heat exchanger 14; however, the electric heating members 15a–15c may be independently disposed at a downstream air side of the heating heat exchanger 14. Further, the arrangement of the electric heating members 15a–15c shown in FIG. 2 may be arbitrarily changed. In the above-described embodiments, three electric heating members 15a–15c are integrated with the heating heat exchanger 14. However, the number of the electric heating members integrated with the heating heat exchanger 14 may be arbitrarily changed.

In the above-described embodiment, the three electric heating members 15a–15c are provided, and the number (Ne) of the electric heating members 15a–15c to be turned on is changed so that the heat-radiating amount of the electric heating members 15a–15c is controlled. However, only a single electric heating member may be provided, and the heat-radiating amount of the electric heating members may be controlled by changing the voltage applied to the single electric heating member.

Such changes and modifications are to be understood as being within the scope of the present invention as defined by the appended claims.

What is claimed is:

1. An air conditioning apparatus for a vehicle having a passenger compartment, the air conditioning apparatus comprising:

a case for forming an air passage through which air is blown into the passenger compartment;

a heat exchanger, disposed in said case, for heating air passing therethrough using a fluid flowing through said heat exchanger as a heating source;

an electric unit, disposed in said case, for heating air to be blown into the passenger compartment;

a blower for blowing air into said case;

target air temperature setting means for setting a target temperature of air to be blown into the passenger compartment; and a control unit which controls electric power supplied to said electric unit to control a heat-radiating amount from said electric unit, and controls an amount of air blown from said blower based on the target temperature of air blown into the passenger compartment and based on the heat-radiating amount of said electric unit.

2. The air conditioning apparatus according to claim 1, wherein said control unit controls the heat-radiating amount of said electric unit based on a temperature of the fluid supplying to said heat exchanger.

3. The air conditioning apparatus according to claim 1, further comprising:

a battery, mounted on the vehicle, for supplying electric power to said electric unit; and battery charging level detection means for detecting a charged level of said battery, wherein said control unit controls the heat-radiating amount of said electric unit based on the charged level of said battery.

4. The air conditioning apparatus according to claim 3, wherein said control unit reduces the heat-radiating amount of said electric unit when said battery charging level detection means detects that the charged level of said battery is lower than a predetermined value.

5. The air conditioning apparatus according to claim 3, wherein:

said control unit provisionally sets the heat-radiating amount of said electric unit to a first predetermined amount based on the temperature of the fluid flowing into said heat exchanger;

said control unit finally sets the heat-radiating amount of said electric unit to the first predetermined amount, when said battery charging level detection means detects that the charged level of said battery is higher than a predetermined value; and said control unit finally sets the heat-radiating amount of said electric unit to a second predetermined amount smaller than the first predetermined amount, when said battery charging level detection means detects that the charged level of said battery is lower than said predetermined value.

6. The air conditioning apparatus according to claim 1, wherein:

said target temperature of air is set to a predetermined temperature; and said control unit controls the amount of air blown from said blower in such a manner that the temperature of air blown into the passenger compartment becomes the predetermined temperature.

7. The air conditioning apparatus according to claim 1, further comprising:

a temperature setting unit for setting a temperature of the passenger compartment by a passenger in the passenger compartment;

temperature detection means for detecting an actual temperature of the passenger compartment; and target air temperature calculating means for calculating the target temperature of air to be blown into the passenger compartment based on the set temperature set by said temperature setting unit and the actual temperature detected by said temperature detection means, wherein said control unit controls the amount of air blown from said blower in such a manner that the temperature of air blown into the passenger compartment becomes the target temperature.

8. The air conditioning apparatus according to claim 1, further comprising:

a valve for controlling an amount of the fluid supplied to said heat exchanger;

fluid temperature detection means for detecting the temperature of the fluid supplied to said heat exchanger;

wherein said valve interrupts the fluid flowing into said heat exchanger, said electric unit is turned on, and said blower is operated, when the temperature of the fluid is lower than a first predetermined temperature during heating operation of the passenger compartment.

9. The air conditioning apparatus according to claim 8, wherein said control unit turns off said electric unit when the temperature of the fluid is higher than a second predetermined temperature during the heating operation, said second predetermined temperature being higher than said first predetermined temperature.

10. The air conditioning apparatus according to claim 8, wherein said valve is opened so that the fluid flows into said heat exchanger, said electric unit is turned on, and said blower is operated, when the temperature of the fluid is higher than said first predetermined temperature and is lower than a second predetermined temperature during the heating operation, said second predetermined temperature being higher than said first predetermined temperature.

11. The air conditioning apparatus according to claim 1, wherein:

said electric unit includes a plurality of electric heating members; and said control unit controls the heat-radiating amount from said electric unit by controlling the number of said electric heating member to be turned on.

12. The air conditioning apparatus according to claim 11, wherein said control unit includes means for determining the number of said electric heating members to be turned on based on the temperature of the fluid flowing into said heat exchanger.

13. The air conditioning apparatus according to claim 11, wherein:

said heat exchanger includes a core portion having a plurality of tubes through which the fluid flows and a plurality of corrugated fins each of which is disposed between adjacent tubes; and said electric heating members are integrated with said core portion of said heat exchanger.

14. An air conditioning apparatus for a vehicle having a passenger compartment, the air conditioning apparatus comprising:

a case for forming an air passage through which air is blown into the passenger compartment;

a heat exchanger, disposed in said case, for heating air passing therethrough using a fluid flowing through said heat exchanger as a heating source;

an electric unit, disposed in said case, for heating air to be blown into the passenger compartment;

a blower for blowing air into said case; and a control unit which controls electric power supplied to said electric unit to control a heat-radiating amount from said electric unit, and controls an amount of air blown from said blower according to the heat-radiating amount of said electric unit and the temperature of the fluid flowing into said heat exchanger.

15. The air conditioning apparatus according to claim 14, wherein said control unit controls the heat-radiating amount of said electric unit based on the temperature of the fluid supplying to said heat exchanger.

16. The air conditioning apparatus according to claim 14, further comprising:

a battery, mounted on the vehicle, for supplying electric power to said electric unit; and battery charging level detection means for detecting a charged level of said battery, wherein said control unit controls the heat-radiating amount of said electric unit based on the charged level of said battery.

17. The air conditioning apparatus according to claim 16, wherein said control unit reduces the heat-radiating amount of said electric unit when said battery charging level detection means detects that the charged level of said battery is lower than a predetermined value.

18. The air conditioning apparatus according to claim 16, wherein:
   said control unit provisionally sets the heat-radiating amount of said electric unit to a first predetermined amount based on the temperature of the fluid flowing into said heat exchanger;
   said control unit finally sets the heat-radiating amount of said electric unit to the first predetermined amount when said battery charging level detection means detects that the charged level of said battery is higher than a predetermined value; and
   said control unit finally sets the heat-radiating amount of said electric unit to a second predetermined amount smaller than said first predetermined amount when said battery charging level detection means detects that the charged level of said battery is lower than said predetermined value.

19. The air conditioning apparatus according to claim 14, wherein:
   said electric unit includes a plurality of electric heating members; and
   said control unit controls the heat-radiating amount from said electric unit by controlling the number of said electric heating member to be turned on.

20. The air conditioning apparatus according to claim 19, wherein said control unit decreases the amount of air blown from said blower, after a predetermined time passed after the number of said electric heating members to be turned on decreases.

21. The air conditioning apparatus according to claim 19, wherein said control unit includes means for determining the number of said electric heating members to be turned on according to the temperature of the fluid flowing into said heat exchanger.

22. The air conditioning apparatus according to claim 19, wherein:
   said heat exchanger includes a core portion having a plurality of tubes through which the fluid flows and a plurality of corrugated fins each of which is disposed between adjacent tubes; and
   said electric heating members are integrated with said core portion of said heat exchanger.

23. The air conditioning apparatus according to claim 6, further comprising:
   fluid temperature detection means for detecting the temperature of the fluid supplied to said heat exchanger,
   wherein said control unit controls the amount of air blown from said blower in such a manner that the temperature of air blown into the passenger compartment becomes the predetermined temperature, when the temperature of the fluid, detected by said fluid temperature detection means, is lower than a set fluid temperature.

24. The air conditioning apparatus according to claim 1, wherein said control unit controls said blower in such a manner that the amount of air blown from said blower becomes smaller as the heat-radiating amount from said electric unit becomes larger.

25. The air conditioning apparatus according to claim 14, wherein said control unit controls said blower in such a manner that the amount of air blown from said blower becomes smaller as the heat-radiating amount from said electric unit becomes larger.

26. An air conditioning apparatus for a vehicle having a passenger compartment, the air conditioning apparatus comprising:
   a case for forming an air passage through which air is blown into the passenger compartment;
   a heat exchanger, disposed in said case, for heating air passing therethrough using a fluid flowing through said heat exchanger as a heating source;
   an electric unit, disposed in said case, for heating air to be blown into the passenger compartment;
   a blower for blowing air into said case;
   fluid temperature detection means for detecting the temperature of the fluid supplied to said heat exchanger; and
   a control unit which controls electrical power supplied to said electric unit to control a heat-radiating amount from said electric unit, and controls and amount of air blown from said blower, in such a manner that:
   the amount of air blown from said blower becomes lower than a predetermined air amount when the temperature of the fluid is lower than a predetermined temperature, and the amount of air blown from said blower is increased in accordance with an increase of the temperature of the fluid when the temperature of the fluid is higher than the predetermined temperature; and
   the heat-radiating amount from said electrical unit is controlled to a predetermined level amount when the temperature of the fluid is lower than the predetermined temperature, and the heat-radiating amount from said electrical unit is decreased in accordance with an increase of the temperature of the fluid when the temperature of the fluid is higher than the predetermined temperature,
   wherein said control unit includes air-amount correction means for correcting the amount of air blown from said blower to be decreased by a predetermined correction amount when the heat-radiating amount is decreased.

27. The air conditioning apparatus according to claim 26, wherein said control unit controls said blower in such a manner that the amount of air blown from said blower becomes smaller as the heat-radiating amount from said electric unit becomes larger.

* * * * *